United States Patent [19]

Bloch et al.

[11] Patent Number: 5,780,150

[45] Date of Patent: Jul. 14, 1998

[54] PAPER-FILM LAMINATE SEALING TAPE

[76] Inventors: Gilbert Bloch, 3349 S. Malo Ct., Palm Beach Gardens, Fla. 33410; Gerald Bloch, 21 E. 87th St., New York, N.Y. 10028; Arnold B. Finestone, 2400 Presidential Way, West Palm Beach, Fla. 33401

[21] Appl. No.: 781,501

[22] Filed: Jan. 9, 1997

Related U.S. Application Data

[63] Continuation of Ser. No. 232,648, Apr. 25, 1994, abandoned, which is a continuation-in-part of Ser. No. 169,007, Dec. 20, 1993, abandoned.

[51] Int. Cl.⁶ .................................. B32B 7/12; C09J 7/04
[52] U.S. Cl. ................ 428/350; 428/354; 428/355 RA; 428/355 CP; 428/511; 428/512; 428/910
[58] Field of Search ........................ 428/343, 350, 428/354, 355, 511, 512, 910, 355 CP, 355 RA

[56] References Cited

U.S. PATENT DOCUMENTS

| | | | |
|---|---|---|---|
| 2,771,385 | 11/1956 | Humphner | 428/350 |
| 3,034,944 | 5/1962 | Chipman | 428/350 |
| 3,560,247 | 2/1971 | Robinson | 428/350 |
| 3,592,682 | 7/1971 | Weiner et al. | 428/350 |
| 4,041,202 | 8/1977 | Williams | 428/138 |
| 4,096,013 | 6/1978 | Lutzmann et al. | 156/272 |
| 4,351,877 | 9/1982 | Williams | 428/350 |
| 4,524,097 | 6/1985 | Graham | 428/141 |
| 4,557,971 | 12/1985 | Williams | 428/343 |
| 4,801,487 | 1/1989 | Kalus et al. | 428/206 |
| 4,833,002 | 5/1989 | Sinclair | 428/195 |
| 4,895,747 | 1/1990 | Birkholz et al. | 428/42 |
| 5,190,798 | 3/1993 | Bloch | 428/40 |
| 5,244,702 | 9/1993 | Finestone et al. | 428/34.3 |
| 5,318,841 | 6/1994 | Gardiner et al. | 428/343 |
| 5,492,765 | 2/1996 | Vratsanos et al. | 428/461 |
| 5,565,252 | 10/1996 | Finestone et al. | 428/40.9 |

FOREIGN PATENT DOCUMENTS

| 1 172 753 | 12/1969 | United Kingdom . |
|---|---|---|
| 1569447 | 5/1977 | United Kingdom . |

*Primary Examiner*—James J. Bell
*Assistant Examiner*—Blaine R. Copenheaver
*Attorney, Agent, or Firm*—Pennie & Edmonds

[57] ABSTRACT

A paper-film laminate sealing tape for sealing a corrugated board carton or other article fabricated of recyclable material. The tape is composed of a base ply formed of high-strength, oriented synthetic plastic film whose opposing surfaces are corona-discharge treated to render them wettable and receptive to adhesives, and a paper face ply adhesively laminated to the base ply. The exposed surface of the base plastic-film ply is coated with a water-remoistenable adhesive, so that when this adhesive is moistened in a tape dispenser, the sealing tape can then be adhered to the carton. Since the remoistenable adhesive is coated on the plastic film ply which is water-impermeable, when this adhesive is moistened with water it remains in a moistened state in a condition to be applied to the carton for a relatively long "open-time" period. By reason of the strong bond between the plastic film ply and the paper face ply which resists delamination, the tape adhered to the carton may be stripped in toto therefrom, so that the carton may then be recycled.

25 Claims, 1 Drawing Sheet

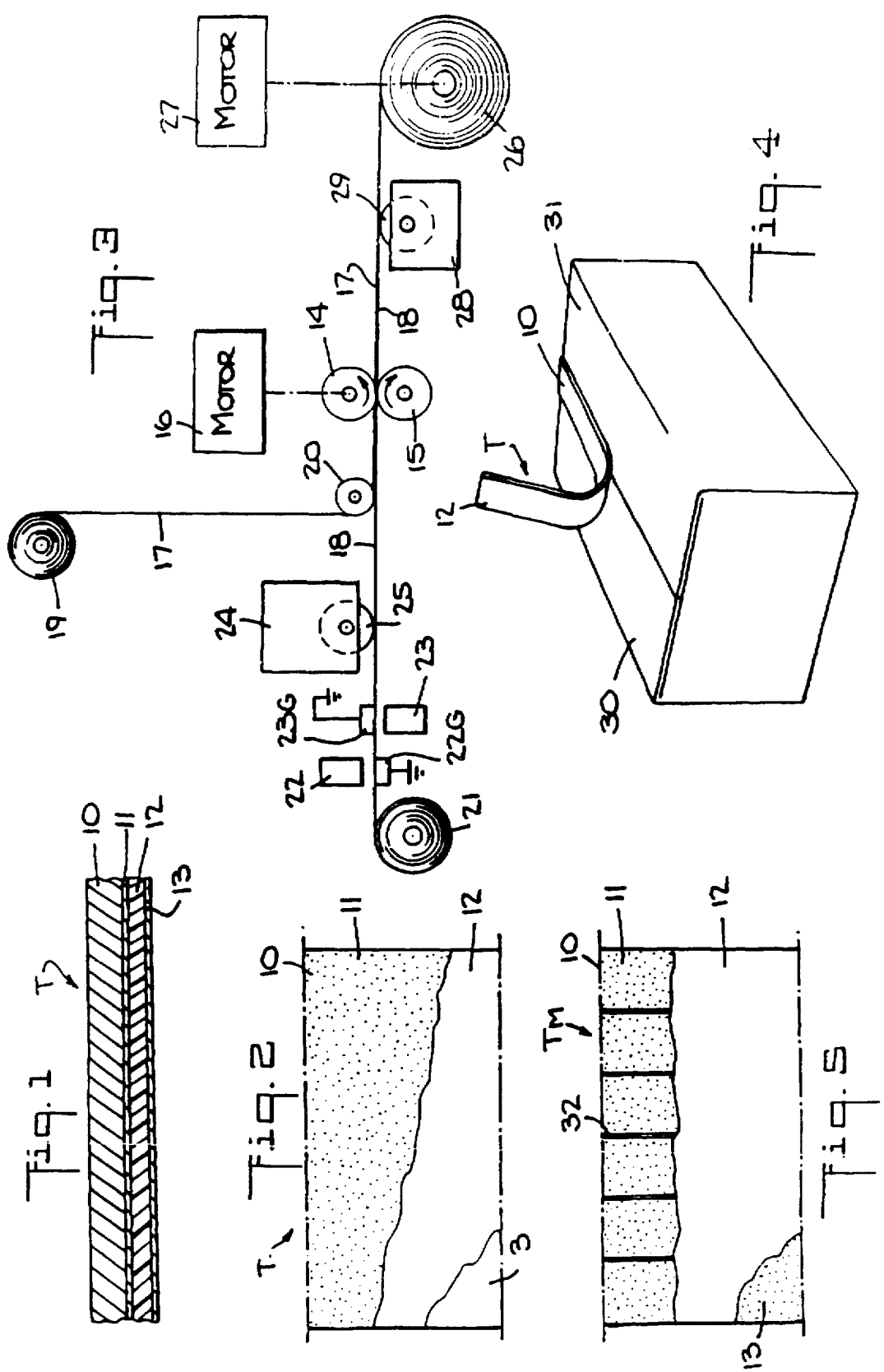

PAPER-FILM LAMINATE SEALING TAPE

RELATED APPLICATIONS

This is a continuation of application Ser. No. 08/232,648, filed Apr. 25, 1994, now abandoned, which is a continuation-in-part of application Ser. No. 08/169,007, filed Dec. 20, 1993 and now abandoned.

BACKGROUND OF INVENTION

1. Field of Invention

This invention relates generally to adhesive tapes for sealing cartons and other articles formed of recyclable material and more particularly to a paper-plastic film laminate tape whose film ply is coated with a water-remoistenable adhesive, the "open-time" of the tape after the adhesive is moistened with water and remains in a moistened condition, being of long duration.

2. Status of Prior Art

Because of rising environmental concerns, in recent years stress has been placed on the use of products fabricated of materials which can be recycled. Thus a strong preference now exists for bags, cartons and other articles made of paper, for these can then be recycled. This is not true of most products made entirely or in part of synthetic plastic materials.

Thus a corrugated board carton lends itself to recycling, but not if the carton has a synthetic plastic film liner to render it water-resistant. A similar problem is encountered when use is made of a standard fiberglass-reinforced paper tape to seal the carton. This tape has its inner and outer paper plies laminated together with glass fibers therebetween by a hot melt polymeric adhesive, the nature of which is such that it is not compatible with recycling operations in which the carton is shredded in a beater and a slurry is then formed of the shredded material for further processing.

In the 1982 patent to Williams, U.S. Pat. No. 4,351,877, there is disclosed a multiple layer laminated tape having an upper strength layer made of a pre-stretched polypropylene film which is laminated to a weak lower carrier layer of thin, low internal bond Kraft paper. The carrier layer has a coating thereon of a water-soluble adhesive which is used to apply the tape to separable portions of a cardboard carton. The carrier layer serves only as a medium to "carry" the water soluble adhesive and also to provide sufficient longitudinal rigidity to permit dispensing of the tape from a standard Kraft paper type tape dispensing machine. Stripping the tape from a carton pulls away the upper plastic layer and splits the Kraft carrier layer that has low internal bond, leaving only so thin a layer of Kraft paper on the carton that it can very easily be broken to permit opening of the carton.

The 1985 patent to Williams, U.S. Pat. No. 4,557,971, discloses a sealing tape in which a paper face layer, providing a surface suitable for printing or marking is laminated to an intermediate polypropylene film layer of low bond Kraft paper. The exposed surface of the paper carrier layer is coated with a water-soluble adhesive which is used to adhere the tape to a carton. Because the intermediate film layer is stronger than the carrier layer, when one wishes to remove the sealing tape from the carton so that the flaps of the carton can be opened, the film layer is stripped off, leaving the carrier layer adhered to the flaps of the carton. Since the carrier layer is of weak paper, it can readily be broken to release the flaps.

When a user cuts a strip of pressure-sensitive adhesive tape from a roll dispenser, this strip remains in a useable condition for an indefinite period, for however long the pressure-sensitive adhesive is exposed to the atmosphere, it continues to be sticky and the strip can be applied to a carton. However, an adhesive tape having a water-moistenable adhesive is active for a limited "open-time." By "open-time" is meant the time period during which the adhesive remains in a moistened state and in a condition to be applied to a carton or other article.

If the tape is a Kraft paper tape coated on one side with a remoistenable adhesive, such as starch, when this adhesive is made wet with water, the water will be absorbed by the paper, as a consequence of which the "open-time" of the tape will be relatively short. This is true also of a fiberglass-reinforced paper tape. With typical paper based sealing tape having a remoistenable adhesive coating on the paper, the "open-time" is from about 10 to 30 seconds, the more aggressive adhesives having shorter "open-times."

The sealing tape disclosed in the above-identified Williams patents have a water-moistenable adhesive coated on the paper carrier laminated to the plastic film, and while the plastic film ply is impermeable to water, the paper ply is not. Hence when the adhesive is moistened with water, the water is quickly absorbed by the paper ply and the "open-time" of the Williams tape is quite short.

When an adhesive tape has a short "open-time" this limits the ability of the user to apply the tape to a carton or other article to be sealed, for the tape must be applied before the expiration of the "open-time" period, otherwise it will not stick to the carton. Hence with tapes having a short open time because the adhesive is coated on a water-absorbent paper, the tape dispenser must be brought close to the carton to be sealed. One cannot carry a strip of moistened tape to a carton some distance from the dispenser, for in the few seconds it takes to reach the carton, the tape will dry out and become useless.

Another drawback of tapes in which a remoistenable adhesive coats a water-absorbent paper layer, such as in the Williams patents, is that when the paper absorbs the water, it then curls, as a consequence of which it becomes difficult to handle the tape which must be applied flat onto the carton to be sealed.

SUMMARY OF INVENTION

The main object of this invention is to provide a sealing tape for sealing a carton or other article formed of recyclable material, the tape being constituted by a paper-plastic film laminate which, though thin, is of high strength, the tape being strippable, in toto, from the article which can then be recycled, for no portion of the tape remains on the article save for some of the water-soluble adhesive.

More particularly, an object of this invention is to provide a tape of the above type which has a long "open-time," the plastic film ply being coated with a remoistenable adhesive which when activated by water is not absorbed by the film ply and does not impart a curl to the tape.

More specifically, an object of the invention is to provide a tape of the above type in which a base ply of biaxially-oriented, synthetic plastic film, whose opposing surfaces are treated to render them wettable and receptive to adhesives, is laminated by a water-based non-remoistenable adhesive to a face ply of paper, the exposed wettable surface of the base ply having a coating thereon of a moistenable adhesive, so that the tape, when moistened by water, can be adhered to the article to be sealed.

A significant feature of the invention is that cold lamination is used; hence no heat is applied to the non-permeable film of the base ply that would impair its orientation and weaken the film, whereas the paper face ply laminated thereto is permeable and affords a printable surface which may be used to mark the tape.

Briefly stated, these objects are attained in a paper-film laminate sealing tape for sealing a corrugated board carton or other article fabricated of recyclable material. The tape is composed of a base ply formed of high-strength, oriented synthetic plastic film whose opposing surfaces are corona-discharge treated to render them wettable and receptive to adhesives, and a paper face ply adhesively laminated to the base ply. The exposed surface of the base plastic-film ply is coated with a water-remoistenable adhesive, so that when this adhesive is moistened in a tape dispenser, the sealing tape can then be adhered to the carton. Since the remoistenable adhesive is coated on the plastic film ply which is water-impermeable, when this adhesive is moistened with water, it remains in a moistened state in a condition to be applied to the carton for a relatively long "open-time" period. By reason of the strong bond between the plastic film ply and the paper face ply which resists delamination, the tape adhered to the carton may be stripped in toto therefrom, so that the carton may then be recycled.

BRIEF DESCRIPTION OF DRAWINGS

For a better understanding of the invention as well as other objects and further features thereof, reference is made to the following detailed description to be read in conjunction with the accompanying drawings, wherein:

FIG. 1 is a cross section taken through a sealing tape in accordance with the invention, the thickness of whose plies is grossly exaggerated;

FIG. 2 is a plan view of the tape whose paper face ply is cut away to expose the plastic film base ply;

FIG. 3 schematically shows a single stage system for manufacturing the tape;

FIG. 4 shows a carton sealed with the tape; and

FIG. 5 is a plan view of a modified tape in which fiberglass reinforcing strands are sandwiched between the plies.

DESCRIPTION OF INVENTION

The Tape

Referring now to FIGS. 1 and 2, a sealing tape T in accordance with the invention includes a face ply 10 formed of Kraft or other paper sheeting. Face ply 10 is cold laminated by an adhesive layer 11 to a base ply 12 of high-strength, synthetic plastic film, such as polyethylene. Preferably the film is formed of a biaxially-oriented material, such as polypropylene or polyester (MYLAR). The opposing film surfaces of the base ply are rendered wettable so that they are receptive to adhesives.

Coated on the exposed wettable surface of base ply 12 is a moistenable adhesive layer 13, so that the sealing tape can be adhered to a carton, a package or other article fabricated of recyclable material. The tape acts to close the flaps or joints of the carton or to carry out any other conventional sealing functions.

The plastic film base ply 12 is preferably no more than two mils in thickness; hence, by itself, it lacks rigidity and body. The Kraft paper face ply 10 is thicker, preferably being 2 or 3 mils thick, but no greater than 5 mils thereby imparting a measure of stiffness and body to the tape.

When film ply 12 is biaxially-oriented, it has exceptional tensile strength, such orientation being effected by stretching the film along both its transverse and horizontal axes to molecularly orient the structure of the film. The strength of the paper face ply, alone, is not high, but the paper-film laminate has both body and high strength, so that a roll of the tape can be used in a standard Kraft paper tape dispenser in which the gummed side of the tape is moistened as the tape is drawn out of the dispenser.

Cold lamination of the plies is effected by a water-based adhesive, preferably a polyacrylic copolymer composition having an affinity both for the paper ply and the film ply. Because the water-based adhesive is fluid at ambient temperature and is not a hot melt adhesive, no heat is applied to the biaxially-oriented film as it is being laminated to the paper ply. By water-based adhesive is meant an adhesive which when cured cannot thereafter be reactivated by water. Also useable is a polyvinyl acetate copolymer.

It is important to bear in mind that a biaxially oriented film is heat-sensitive and that at elevated temperatures, the film relaxes and loses its molecular orientation and strength. It is known, for example, that when two sheets of biaxially-oriented polyester film are seamed together, using an ultrasonically-activated sealing bar for this purpose which creates internal friction and heat within the film and causes the superposed films to soften and fuse, the resultant sealing line is weak, and the sheets then tend to tear along this line. Cold lamination is, therefore, essential to the present invention in order to produce a tape laminate of high strength.

The moistenable, water-soluble adhesive coating 13 on the exposed surface of plastic film base ply 10 is preferably a water-based starch or acrylic composition a water-based latex modified to render it self-adhering, or of any other composition conventionally used in gumming tape.

It is to be noted that a synthetic plastic film material, such as polypropylene, is normally not receptive to adhesives, especially water-based adhesives. Hence if one were to apply to the surface of this film a water-based adhesive which is flowable at ambient temperature or at a temperature somewhat above ambient but not at the elevated temperature of a hot melt adhesive, the adhesive will not be adsorbed by the film. Essential to the invention is that the opposing surfaces of the film forming the base ply of the tape be treated so as to render them wettable and hence receptive to adhesives. To this end, these surfaces are subjected to a corona discharge treatment which enhances their surface energy, as measured in dynes, and thereby renders them wettable to allow for better bonding of adhesives applied thereto.

The Kraft paper face ply 12, which is formed of cellulosic fibers, is permeable and therefore receptive to printing and writing. Because of this, one may print on the paper face ply such notices a FRAGILE or HANDLE WITH CARE, or one may write with a marker pen on the tape. And in practice, a colored paper ply may be used to render the tape more attractive. And one can apply to the tape stick-on labels or adhere a second sealing tape thereover to further reinforce the seal. This would not be possible with a sealing tape whose exposed surface is that of a synthetic plastic film.

The Manufacturing System

FIG. 3 schematically illustrates a single-stage system for producing a paper-plastic film laminate tape in accordance with the invention. The system includes a combining station having a pair of cooperating pressure rolls 14 and 15 driven at high speed by a motor 16. The nip between these rolls is appropriate to the thickness of the webs to be laminated to provide the desired degree of laminating pressure to ensure secure bonding of the webs.

Fed concurrently into the nip of rolls 14 and 15 at the combining station are a web 17 of Kraft paper for forming the paper face ply 10 of the tape, and a web 18 of synthetic, plastic film material to form base ply 12. Web 17 is drawn from a Kraft paper supply reel 19 supported at an elevated position. Paper web 17 is drawn downwardly from this reel and is guided by an idler roll 20 into a horizontal path leading into the nip of the combining rolls.

Film web 18 is drawn from a film supply reel 21 which is placed at a position to feed film web 18 directly into a horizontal path toward the nip of the combining rolls. Reel 21 is placed well in advance of the combining station in order to expose a fairly long stretch of film web before it enters the combining rolls.

Along this stretch of biaxially-oriented film web 18 formed of a synthetic plastic material such as polypropylene having a high dielectric constant, is a first corona discharge electrode 22 which is spaced above the upper surface of the film to create an ionizable air gap therebetween. The film web runs along a ground electrode 22G in vertical alignment with discharge electrode 22. A high-frequency voltage having an amplitude sufficient to produce a corona discharge is applied to electrode 22. The corona discharge, which is directed toward the upper surface of the film web, increases the surface energy at the web surface to render it wettable and, therefore, receptive to adhesives, but it does not affect the molecular orientation of the film.

Also along the stretch following the first discharge station 22–22G is a second corona discharge station for subjecting the undersurface of film web 18 to a corona discharge to render this surface wettable so that it is receptive to an adhesive to be later applied thereto. The second station consists of a corona discharge electrode 23 which is spaced from the undersurface of web 18 to create an air gap therebetween, and a cooperating ground electrode 23G engaging the upper surface of the web.

Intermediate the second corona discharge station 23–23G and the combining station is an adhesive applicator 24 having a coating roll 25 which engages the now wettable upper surface of film web 18 and applies thereto the water-based, acrylic polymer adhesive for laminating the film web to the paper web to form the laminating adhesive layer 11 of the tape.

Thus concurrently entering the nip of pressure rolls 14 and 16 of the combining station at ambient temperature are paper web 17 and the adhesive-coated film web 18. These webs are subjected to pressure by pressure rolls 14 and 15, lamination being effected by this action.

The laminated webs from the combining station are wound on an output reel 26 driven by a motor 27 whose operation is synchronized with motor 16 driving the pressure rolls, for these motors together serve to draw the webs from their supply reels.

Output reel 26 is so spaced from the combining station as to provide a fairly long stretch sufficient to permit drying of the adhesives applied to the webs. In this stretch, below plastic film web 18 is an applicator 28 whose coating roll 29 engages the now wettable undersurface of film web 18 to coat this surface with the re-moistenable adhesive forming the moistenable adhesive layer 13 on the plastic film underside of tape T.

Thus, wound on output reel 26 are the laminated paper and film webs, the exposed surface of the film web having a moistenable adhesive coating thereon. In practice, forced air dryers may be provided at positions following the combining station and following adhesive applicator 28 to fully dry the adhesives before the laminated webs are wound onto the output reel. And while the forced air is heated, the temperature thereof is well below and elevated temperature that would impair the biaxial orientation of the film.

Since a typical sealing tape has a width of two or three inches, and the webs from which these tapes are derived are much broader, the laminated paper-plastic film webs on output reel 26 are slit into tapes of the desired width by a conventional slitter having a bank of rotary slitter blades.

Applications

FIG. 4 shows a corrugated board carton 29 having complementary flaps 30 and 31 which are sealed by a paper-film laminate tape T in accordance with the invention. To this end, the moistenable adhesive coating on the plastic film underside of the tape is moistened in the tape dispenser so that the tape bridging the edges of the flaps can be adhered thereto to seal the carton.

When tape T is so applied, its paper face ply 10 is exposed. The surface of this ply is printable; hence if the carton contains articles made of glass, a FRAGILE GLASS notice may be stamped onto the tape.

While the carton may in the course of shipment be exposed to rain or snow, and this will wet the paper face ply, water cannot enter the carton, for the non-permeable plastic base ply which seals the carton acts as a water barrier. And because the strength of the tape is largely determined by the strength of the plastic film base ply, the tape will not be weakened by water even though its paper ply is wet.

But when the carton has served its purpose and is to be recycled, then before doing so, it is necessary to remove tape T, for its plastic film base ply is not acceptable to a paper recycling system. To remove tape T, it is simply stripped, in toto, from the carton, as shown in FIG. 4, for the plastic film base ply 12 which is adhered to flaps 30 and 31 is far stronger than the corrugated paper board stock of the flaps; hence when tape T is stripped off, the cellulose fibers on the surface of the flaps rupture to release the tape. Thus the tape is removed in toto from the carton which can now be recycled.

Modifications

The modified tape TM shown in FIG. 5 is essentially the same as tape T shown in FIG. 1, except that it is reinforced with fiberglass strands which do not, however, significantly increase the thickness of the tape.

To this end, sandwiched between paper face ply 10 and plastic film base ply 12 is a longitudinal array of parallel fiberglass strands 32. Each strand 32 is composed of a small cluster of glass fibers, each preferably having a denier of 0.1. In practice, two fibers are sufficient to form a cluster, although a greater number may be used to enhance the strength of the tape.

In making a reinforced tape of this type, a system essentially the same as that shown in FIG. 3 may be used, the strands of fiberglass being drawn from supply reels and being fed into the nip of the combining rolls between the dry paper web 17 and the adhesive coated web film 18, so that the strands, before entering the combining station, are wetted by the laminating water-based adhesive.

While there has been shown and described a preferred embodiment of a paper-film laminate sealing tape in accordance with the invention, it will be appreciated that many changes and modifications may be made therein without, however, departing from the essential spirit thereof. Thus, instead of a single-stage system to produce the tape, a two-stage system may be used, in the first stage of which the paper and plastic film webs are joined together, but the outer surface of the plastic film web is not yet coated with a moistenable adhesive. In the second stage, the fully dried, joined webs are drawn through an adhesive applicator which applies the moistenable adhesive to the outer surface of the film web to form a wet coating which is then dried before the web is wound on an output reel or fed into a web slitter station.

In producing a sealing tape in accordance with the invention, it is not essential that the opposing surfaces of the plastic film web be rendered wettable by subjecting these surfaces to a corona discharge in a laminating machine, as shown in FIG. 3, before the film web is combined with the paper web. In practice, the film web may be pre-treated to render its opposing surfaces wettable, in which case the film web supply roll carries an already wettable film web, thereby dispensing with the need for including corona discharge stations in the laminating machine. However, even when the film web is so pre-treated, it may still be desirable to include corona discharge stations in the laminating machine in order to assure proper wettability of the opposing surfaces of the film web before adhesives are applied thereto.

Advantages

The corona-discharge treatment of the surfaces of a synthetic plastic material to render them wettable is known. While the effect of such treatment is to increase the surface tension or energy, this effect is not permanent. Hence should a film web have its surfaces treated and the web is then stored for a few days or a longer period before being laminated to a paper or other web, then the corona discharge treated surfaces may be of reduced effectiveness and a strong lamination will not be attained. In the present invention, corona-discharge treatment of the synthetic plastic film web takes place just prior to lamination to the paper face ply so that the plastic surfaces are then highly receptive to adhesive coatings.

In the Williams patent U.S. Pat. No. 4,351,877 which discloses a sealing tape for cartons, and makes use of high-strength plastic film for this purpose, it is noted that while this tape is stronger than a conventional paper tape, "an inherent problem with using plastic is that it cannot hold a water-soluble adhesive." By a water-soluble adhesive is meant a remoistenable adhesive, such as is found on the flap of mailing envelopes. It is for this reason that in Williams the plastic film layer is bonded to a paper carrier layer serving "only as a medium to 'carry' the water-soluble adhesive that could not otherwise be applied onto the plastic layer."

Hence when the Williams '877 tape is used to seal the flaps of a cardboard carton, and later stripped off so that the carton can be opened, the paper carrier layer "remains on the carton and is so weak that it may be easily broken to permit opening of the carton." In a laminated tape in accordance with the invention having a long "open-time" characteristic in which the plastic film ply is directly coated with a layer of a moistenable adhesive, when the tape is stripped off the carton, it is stripped in toto and nothing remains on the carton.

Similarly in Williams patent U.S. Pat. No. 4,557,971, the laminated sealing tape disclosed in this patent has its film layer laminated to a paper carrier layer that is coated with a water-soluble, remoistenable adhesive, which is used to secure the tape to a carton.

As pointed out previously, because in the Williams patents, it is the paper carrier layer that is coated with a water-remoistenable adhesive, and the water is absorbed by the paper, the Williams tapes have a short "open-time," and tends to curl, whereas a tape in accordance with the invention, the tape has a long "open-time" characteristic and is non-curling, for the remoistenable adhesive is coated on the water-impermeable plastic film ply of the tape and wtting of the plastic ply does not cause the tape to curl.

In a laminated sealing tape in accordance with the invention, the plastic film base ply whose opposing surfaces are corona-discharge treated just before one surface of the ply is laminated to a paper face ply by an adhesive which is preferably of a water-based acrylic copolymer composition, the other treated surface of the film ply is directly coated with a moistenable adhesive. Once the acrylic copolymer laminating adhesive is set, it is then water-impermeable and cannot be reactivated with water. The other treated surface of the film ply which is coated with a remoistenable adhesive may use a conventional starch adhesive or other known gumming material for this purpose, the tape so coated having an "open-time" of long duration, for water is not absorbed by the film ply.

When a tape in accordance with the invention is used to seal a carton and is later stripped off its flaps so that the carton can be opened or recycled, it is stripped of in toto. The reason this happens is that the film ply to which the remoistenable adhesive is bonded is far stronger than the paper stock from which the carton is fabricated, and when the tape is stripped, the cellulose fibers on the surface of the carton are ruptured to release the tape.

While there has been disclosed a sealing tape in which a paper face ply is laminated to the film ply, and this paper face ply acts not only to provide a printable surface but also to impart body to the tape, in practice one may dispense with the paper face ply. One may form the tape of a synthetic plastic material of high strength whose opposing surfaces are corona-discharge treated to render them wettable.

The inner surface is coated directly with a moistenable adhesive and the treated outer surface, because it is receptive to printing inks, may be printed or labels may be adhered therto, for the surface is wettable.

We claim:

1. A sealing tape for use on cartons and other articles fabricated of recyclable material, the tape comprising:
    (a) a base ply formed of high-strength oriented synthetic plastic film having corona-discharge treated opposing surfaces which render these surfaces wettable;
    (b) a face ply formed of paper adhesively cold laminated by a water-based adhesive to one surface of the base ply whereby the orientation of the film and its strength are maintained; and
    (c) a layer of water re-moistenable adhesive coating the other wettable surface of the base film ply and bonded thereto, said film ply being water impermeable whereby the tape, when the adhesive layer is moistened with water, can be applied in a moistened condition during a relatively long "open-time" period during which the adhesive remains in a moistened state in a condition to be applied to an article to be sealed.

2. The tape product of claim 1 wherein the water re-moistenable adhesive layer is formed from a starch composition.

3. The tape product of claim 1 wherein the first corona discharge treated surface is adhesively laminated to the paper layer by a water based adhesive.

4. The tape product of claim 1 wherein the water based adhesive includes an acrylic copolymer composition.

5. The tape product of claim 3 wherein the water based adhesive includes a polyvinyl acetate copolymer.

6. The tape product of claim 1 wherein adhesive used to adhesively laminate the first corona discharge treated surface to the paper layer produces a stronger bond than the water re-moistenable adhesive layer for allowing the paper-plastic film laminate to be stripped off an item in one piece.

7. The tape product of claim 1 wherein the plastic film is an oriented film.

8. The tape product of claim 1 wherein the paper layer comprises Kraft paper.

9. The tape product of claim 1 wherein the plastic film is formed from a polymer selected from the group consisting of polypropylene, polyethylene and polyester.

10. The tape product of claim 1 wherein the paper layer has a maximum thickness of about five mils.

11. The tape product of claim 1 wherein the plastic film layer has a maximum thickness of about two mils.

12. An adhesive tape product moistenable to allow adherence to various items in applications including taping and sealing, the tape product comprising:

a paper layer;

a plastic film layer having first and second corona discharge treated surfaces, the first corona discharge treated surface being adhesively laminated to the paper layer to form a paper-plastic film laminate;

a water re-moistenable adhesive layer disposed on the second corona discharge treated surface of the plastic film layer and exposed for use in adhering the paper-plastic film laminate to the various items; and reinforcement disposed between the paper layer and the plastic film layer.

13. The tape product of claim 12 wherein the reinforcement comprises an array of fiberglass strands.

14. An adhesive tape product moistenable to allow adherence to various items in applications including taping and sealing, the tape product comprising:

a paper layer having a first surface and a second, exposed surface which is printable;

an oriented, water-impermeable plastic film layer having first and second corona discharge treated surfaces, the first corona discharge treated surface being adhesively laminated to the first surface of the paper layer to form a paper-plastic film laminate; and a water re-moistenable adhesive layer disposed on the second corona discharge treated surface of the plastic film layer and exposed for use in adhering the paper-plastic film laminate to the various items;

wherein the plastic film layer has a strength sufficient to allow the film to be stripped in one piece from an item to which the laminate is adhered.

15. The tape product of claim 14 wherein the water re-moistenable adhesive layer is formed from a starch composition.

16. The tape product of claim 14 wherein the first corona discharge treated surface is adhesively laminated to the paper layer by a water based adhesive.

17. The tape product of claim 16 wherein the water based adhesive includes an acrylic copolymer composition.

18. The tape product of claim 16 wherein the water based adhesive includes a polyvinyl acetate copolymer.

19. The tape product of claim 14 wherein adhesive used to adhesively laminate the first corona discharge treated surface to the paper layer produces a stronger bond than the water re-moistenable adhesive layer for allowing the paper-plastic film laminate to be stripped off an item in one piece.

20. The tape product of claim 14 wherein the paper layer comprises Kraft paper.

21. The tape product of claim 14 wherein the plastic film is formed from a polymer selected from the group consisting of polypropylene, polyethylene and polyester.

22. The tape product of claim 14 wherein the paper layer has a maximum thickness of about five mils.

23. The tape product of claim 14 wherein the plastic film layer has a maximum thickness of about two mils.

24. The tape product of claim 14 further including reinforcement disposed between the paper layer and the plastic film layer.

25. The tape product of claim 24 wherein the reinforcement comprises an array of fiberglass strands.

* * * * *

UNITED STATES PATENT AND TRADEMARK OFFICE
CERTIFICATE OF CORRECTION

| | | |
|---|---|---|
| PATENT NO. | : | 5,780,150 |
| DATED | : | July 14, 1998 |
| INVENTOR(S) | : | Gilbert Bloch, Gerald Bloch, Arnold B. Finestone |

It is certified that error appears in the above-identified patent and that said Letters Patent is hereby corrected as shown below:

Replace claim 1 of the patent with the following claim:

1. An adhesive tape product moistenable to allow adherence to various items in applications including taping and sealing, the tape product comprising:

a paper layer;

a water-impermeable plastic film layer having first and second corona discharge treated surfaces, the first corona discharge treated surface being adhesively laminated to the paper layer to form a paper-plastic film laminate; and a water re-moistenable adhesive layer disposed on the second corona discharge treated surface of the plastic film layer and exposed for use in adhering the paper-plastic film laminate to the various items;

wherein the plastic film layer has a strength sufficient to allow the film to be stripped in one piece from an item to which the laminate is adhered.

Signed and Sealed this

Eighth Day of June, 1999

Attest:

Q. TODD DICKINSON

*Attesting Officer*       *Acting Commissioner of Patents and Trademarks*